(12) United States Patent
Greif et al.

(10) Patent No.: US 7,244,282 B2
(45) Date of Patent: Jul. 17, 2007

(54) SEPARATOR DEVICE

(75) Inventors: Volker Greif, Harthausen (DE);
Guenther Kissel, Neustadt (DE); Jan Zink, Viernheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 359 days.

(21) Appl. No.: 10/878,492

(22) Filed: Jun. 29, 2004

(65) Prior Publication Data

US 2005/0028499 A1 Feb. 10, 2005

(30) Foreign Application Priority Data

Jul. 4, 2003 (DE) ................. 103 30 296

(51) Int. Cl.
*B01D 45/12* (2006.01)

(52) U.S. Cl. .................. 55/347; 55/348; 55/396; 55/457; 123/198 E

(58) Field of Classification Search .............. 55/347, 55/348, 394, 396, 457, 466; 123/198 E
See application file for complete search history.

(56) References Cited

U.S. PATENT DOCUMENTS

| 4,289,611 | A | * | 9/1981 | Brockmann | ............... 209/710 |
| 4,537,608 | A | * | 8/1985 | Koslow | ...................... 55/337 |

FOREIGN PATENT DOCUMENTS

DE          29801034 U1     6/1998

\* cited by examiner

*Primary Examiner*—Robert Hopkins
(74) *Attorney, Agent, or Firm*—Crowell & Moring LLP

(57) ABSTRACT

A separator device, particularly a separator for separating particles from an air stream, which includes a first stage having at least one centrifugal separator through which the fluid flows along a first axial path. The centrifugal separator has a guide device for generating a spiral movement of the fluid. A second stage is directly downstream from the first stage and has an essentially cylindrical housing. A dust discharge is provided in the area of the fluid outlet, and a central pipe which is arranged concentrically and has a truncated conical shape is provided in the second stage.

6 Claims, 2 Drawing Sheets

SEPARATOR DEVICE

BACKGROUND OF THE INVENTION

The present invention relates to a separator device, in particular a device for separating particles from a stream of air, comprising a first stage with at least one centrifugal separator through which a fluid to be cleaned flows along a first axial path, the centrifugal separator including a guide device for generating a spiral movement of the fluid.

A separator device in the form of an inertial separator device removes particles from a fluid flowing through the device.

Such devices may be used in intake systems for engines of all types, such as engines for military purposes or engines for all-terrain vehicles. The engines may be either gasoline engines or diesel engines.

In this application, the fluid is air and the particles are dust and other materials such as sand or coarse sand.

The function of the separator device is to remove such particles from the air in a first stage.

German Utility Model no. DE 29801034U discloses a separator device which includes a first stage having a plurality of centrifugal separators through which a fluid flows along a first axial path, and a second stage downstream from the first stage having a plurality of centrifugal separators through which a fluid flows along a second axial path.

Each separator of the first and second stages has an opening with a diameter such that the axial paths of the first stage are offset with respect to the axial paths of the second stage.

One disadvantage of this device may be seen in the fact that the design is complex in terms of the construction and requires a large number of individual components.

SUMMARY OF THE INVENTION

The object of the present invention is to avoid the aforementioned disadvantages and to provide a separator device, in particular for separating particles from a stream of air, which will have a high efficiency and can be manufactured inexpensively.

These and other objects are achieved in accordance with the present invention by providing a separator device for separating particles from a stream of fluid, said separator device comprising a first stage with at least one centrifugal separator through which the fluid flows in along a first axial path, said at least one centrifugal separator having a fluid guide member for generating a spiral movement of the fluid, and said separator device further comprising a second stage directly downstream from the first stage; said second stage comprising an essentially cylindrical housing with a fluid outlet for a cleaned stream of fluid, and a concentrically arranged frustoconical central tube and a dust discharge for separated particles in the area of the fluid outlet.

An advantage of this invention is that the separator device is comprised of only a few parts, has a high efficiency, and a simple design. It has been found that a single guide device is sufficient to separate particles from a stream of air in a first separator stage and to remove any remaining particles from the air stream in a downstream second stage without any additional guide device.

Another advantage of this design is that particles which have a certain particle size in particular and which may ricochet from the walls of the separator and then be entrained by the air stream, lose kinetic energy between the two separation stages due to the two-stage separation, without any guide device in between, and then can be separated from the fluid stream and discharged from the second stage.

According to one advantageous embodiment of this invention, the second stage extends with its inlet side at least partially into the first stage. This means that the elements can be inserted one into the other, and a very compact design can be achieved.

Another embodiment of this invention uses a conical insert in the second stage which can further improve the degree of separation. The conical insert guides the particles in a targeted manner toward the outside and serves to enhance the removal of dust.

According to another embodiment of this invention, a single collecting vessel is provided for both stages. This means that the overall system is arranged in a housing and the particles discharged can collect in the housing.

According to another embodiment of this invention, a plurality of centrifugal separators are arranged in an array. This array is a rectangular housing on one end face of which are provided the inlet openings for supplying the air stream and on the opposing end face of which are provided the outlet openings for the cleaned stream of air. The distance between the two end faces is filled by the separation devices. This separation device is preferably used for supplying intake air to an internal combustion engine. This kind of separator device has proven suitable for separating particles of dirt or dust from engine intake air, especially when an internal combustion engine is being operated in areas that have a high dust level.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawing figures in which.

DETAILED DESCRIPTION OF PREFERRED EMBODIMENTS

Figure 1:
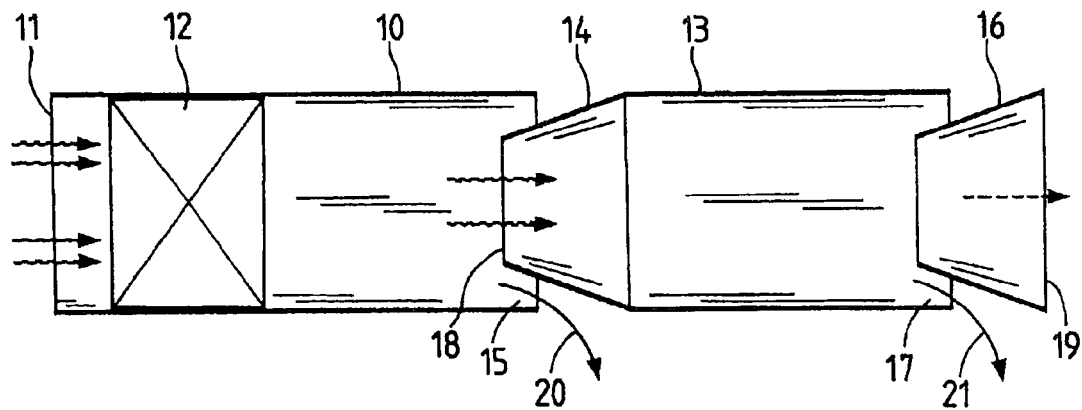
FIG. 1 is a schematic illustration of a first separator device according to the invention.

The separator device according to FIG. 1 consists essentially of a cylindrical housing 10 with an air inlet opening 11 and a guide device 12 situated therein. Guide device 12 may also be referred to as a vortex generator and has helical guide surfaces surrounding a cylindrical hub. If desired, the housing 10 may be constructed in one piece with the guide device 12. Downstream from the housing 10 there is another housing 13 which has at its inlet end an outer surface 14 in the form of a truncated cone which forms an annular gap 15 between the outlet end of housing 10 and the outer surface 14 of housing 13. Another housing body 16 in the form of a truncated cone or frustoconical tube is arranged at the outlet end of housing 13, with an annular gap 17 again being formed between this conical body and the housing 13. The air flowing through the separator device goes from the air inlet opening to the guide device 12, which causes the air to rotate. The rotating air stream then flows to the inlet opening 18 of the housing 13 and from there the air passes goes through the housing body 16 to the air outlet opening 19. Entrained dust or entrained particles are thrown to the outside because of the rotational motion of the air and are discharged through the first annular gap 15 as indicated by arrow 20. Any additional particles still present in the air then are conveyed to the annular gap 17 because of the continued rotation of the air in the housing 13 and are removed there from the air stream as indicated by the arrow 21.

Figure 2:
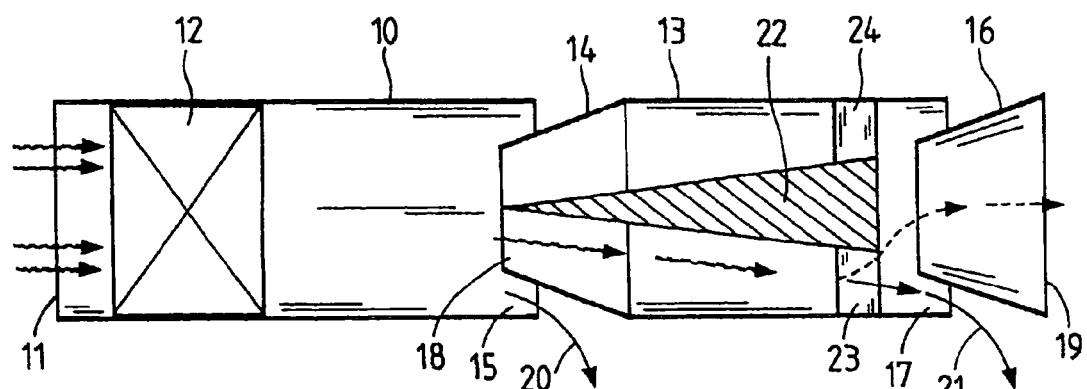
FIG. 2 is a schematic diagram of a variant embodiment of the separator device according to the present invention.

FIG. 2 shows a variant of the separator illustrated in FIG. 1. The only difference here is that a conical insert 22 is provided in the so-called second stage of the separator, i.e., in the housing 13. This conical insert may be connected by webs 23, 24 to the housing. The conical insert serves to guide the air and any entrained particles toward the inside wall area of the second stage in a targeted manner. In this way, the conical insert can improve the separation performance of the separator device.

Figure 3B:
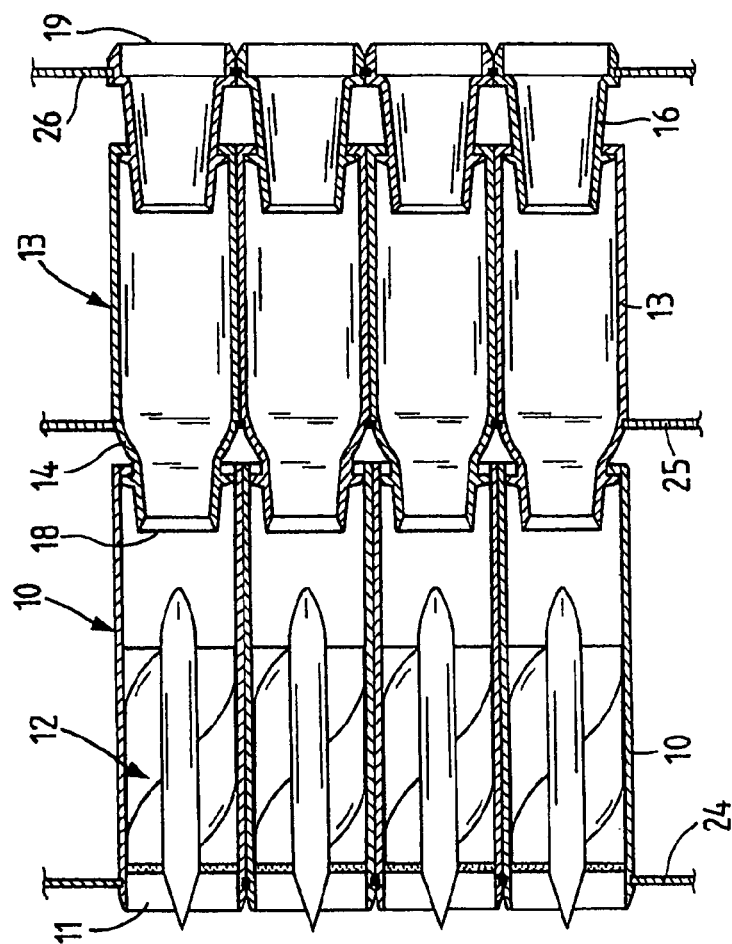
FIGS. 3a and 3b are a schematic sectional view and a top plan view, respectively, of a separator system according to the invention.
Figure 3A:
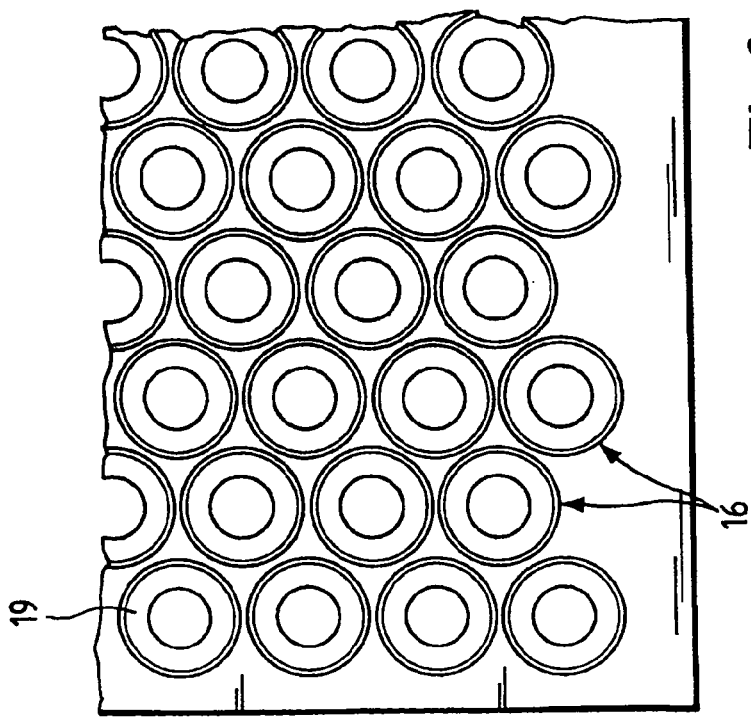

FIGS. 3a and 3b show a plurality of separation devices which are arranged in an array. The individual separation devices 23 are arranged in direct proximity to one another, as shown in the view from above according to FIG. 3a. The respective housing 10 is attached to an end wall 24, which means that the end wall has boreholes and the individual housings can be inserted into these boreholes. Parallel to this side wall, there is a central wall 25 which also has boreholes in which the housings 13 are secured. The closure is formed by an end wall 26 which is arranged on the air outlet end and serves to attach the housing body 16. The dust is discharged within the housing, which is formed from the two end walls 24 and 26 and is only partially illustrated in the drawing figure. In the lower region of the housing, i.e., at the bottom, the dust is discharged through appropriate dust discharge openings or valves.

The foregoing description and examples have been set forth merely to illustrate the invention and are not intended to be limiting. Since modifications of the described embodiment incorporating the spirit and substance of the invention may occur to persons skilled in the art, the invention should be construed broadly to include all variations within the scope of the appended claims and equivalents thereof.

What is claimed is:

1. A separator device for separating particles from a stream of fluid, said separator device comprising a first stage with at least one centrifugal separator through which the fluid flows in along a first axial path, said at least one centrifugal separator having a fluid guide member for generating a spiral movement of the fluid, and said separator device further comprising a second stage directly downstream from the first stage; said second stage comprising an essentially cylindrical housing with a fluid outlet for a cleaned stream of fluid, a concentrically arranged frusto-conical central tube and a dust discharge for separated particles in the area of the fluid outlet, and a conical insert in the second stage for improving the degree of separation.

2. A separator device according to claim 1, wherein said fluid is air and said particles comprise dirt and dust particles.

3. A separator device according to claim 1, wherein the second stage has a fluid inlet which extends at least partially into the first stage.

4. A separator device according to claim 1, further comprising a common collecting vessel for collecting particles separated by the first stage and particles separated by the second stage.

5. A separator device according to claim 1, wherein said device comprises a plurality of centrifugal separators arranged in an array.

6. In an air intake for an internal combustion engine, the improvement comprising a separator device according to claim 1, arranged to separate dirt or dust from an air stream passing through said air intake.

* * * * *